March 24, 1936.  A. S. JOHNSON  2,034,817
DRY CELL
Filed May 19, 1932
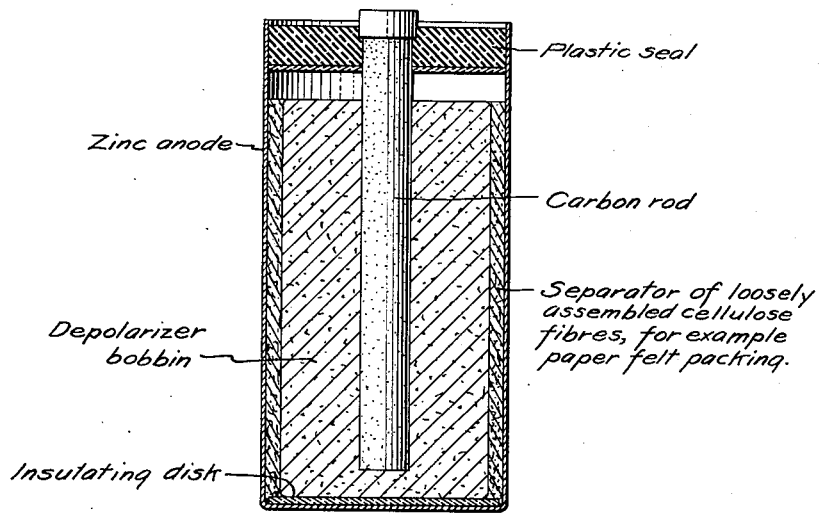
Inventor:
Adger S. Johnson,
By Byrne Townsend & Potter,
Attorneys.

Patented Mar. 24, 1936

2,034,817

UNITED STATES PATENT OFFICE 2,034,817

DRY CELL

Adger S. Johnson, Lakewood, Ohio, assignor to National Carbon Company, Inc., a corporation of New York Application May 19, 1932, Serial No. 612,289

7 Claims. (Cl. 136—131)

The invention relates to dry cells, and has particular reference to a new and improved type of separator system for use in such cells.

It is an object of the invention to improve the service capacity of dry cells and increase their electrical output, by providing a larger capacity of active electrolyte than heretofore used, with greater stability against redistribution and leakage thereof under the stress of service.

In the accompanying drawing, the single figure shows a dry cell illustrating one embodiment of my invention.

In the common type of dry cell, the anode consists of a cylindrical zinc cup, and the cathode comprises a carbon rod about the lower portion of which is molded or tamped a depolarizing mix of carbonaceous material and manganese dioxide. The carbon rod and its enveloping mix may be formed as a unit before introducing into the zinc cup, in which case this unit is called a bobbin, or the depolarizing mix may be tamped directly into the cup about the centered carbon rod. In either case there is an interelectrode space between the zinc cup and the mix which is occupied by a separating medium. The separator serves to prevent internal short circuit of the electrodes, acts as a vehicle for electrolyte, and also maintains uniform contact between the electrolyte and the zinc. It is with this separating system that the present invention is directly concerned.

Dry cells were first made with very dense separating systems employing the use of such materials as plaster of Paris and clay. In an effort to improve the separator as a vehicle for electrolyte, dense paper such as blotting paper and pulpboard then came into use. More bibulous systems were then developed by adding paste, which in addition to increasing the solution volume, also improved the electrolyte contact with the zinc. Further improvements were then effected chiefly by a gradual displacement of fibrous cellulosic materials such as paper and cloth through the addition and eventual substitution of materials such as cereal paste, until in the most modern cells an unlined construction is used, and the only separator between the mix and the can consists of a layer of gelatinous paste, usually comprising cereal and electrolyte.

Although the opinion has been that the paste separating medium of the modern cell will hold as much electrolyte as can be used successfully, I now propose to use a minimum quantity of paste, retaining only enough for good contact at the zinc, and to introduce cellulose again as the main solid filler. The cellulose used is, however, of a nature heretofore not known in this art, and consists of highly dispersed fibers very absorbent to electrolyte, so as to minimize the solids and increase the initial electrolyte in the interelectrode space. With my construction the electrolyte content of the mix may also be higher, as the high permeability to diffusion of the separator permits the mix to freely imbibe electrolyte from the interelectrode space.

In accordance with my invention I employ as the major component of the separator system a packing material such as felt or wadding which consists of a very loosely assembled mass of cellulose fibers. Packing materials as a class may be recognized by their function as distinguishing over more dense materials of corresponding types whose use is for a binding or containing purpose, where certain strength is essential. For example cotton batting or absorbent cotton is primarily a packing material as compared with cotton cloth; paper wadding is distinguished by function from wrapping paper; and excelsior is well known as a packing material in preference to veneer or lumber. Heretofore battery separators of fibrous materials, consisting of cloth, ordinary paper, paper board, veneer sheets, and the like, have all fallen in the class of container materials where certain strength is desirable. I especially prefer to use paper felt packing material which is now commercially available in several familiar forms, one of which is sold under the name of "Kimpak". It can be obtained in sheets of various thickness and size for packing purposes, and consists of paper pulp fiber composing a total texture of very low density. Felts of texture comparable with that of cotton batting are in general suitable for the purposes of the invention, it being of course understood that the material of which the felt is composed is one not detrimental to a dry cell.

As illustrative of one method of incorporating my new separating system into a cell structure, I will describe its application to the ordinary flashlight type of dry cell, a small sized cell of the bobbin type. A bobbin of regular size, and formed in the usual manner, is used. This bobbin is then wrapped in several layers of paper felt packing of the type described, and is then dipped in a relatively thin cereal paste made from the usual ingredients. A suitable paste would be one containing around 10% by weight of cereal, consisting of wheat flour, starch, or both, together with 90% of electrolyte of a composition approximately that desired for use in the cell as a whole. A suitable proportion of mercury salt for amalgamating purposes may also be added to this paste. The wrapped bobbin is then inserted into a zinc can which may carry in its bottom the usual insulating disc. The wrapped bobbin is a fairly snug fit in the can, and there is only slight side play. One or more small portions of ordinary battery electrolyte are then added. The purpose of these additions is to bring the bobbin and the separator into virtual imbibition equilibrium. Under resulting conditions the entire internal assembly is just short of showing unabsorbed free electrolyte, and the separator system takes on a slight expansion sufficient virtually to eliminate side play of the bobbin. At this point the various component surfaces are in firm and substantially uniform electrolytic contact. The cell preferably is then cooked for a short period at a sufficiently high temperature to set the cereal paste in good contact with the zinc. The cell is then finished in the usual manner, leaving the ordinary air space above the bobbin, surmounted by the sealing closure at the top of the cell.

A cell made in this manner has proven to be of exceptional quality. The advantages of the cell are especially noticeable under heavy commercial service. For example on the Heavy Industrial test, which is the standard test for extremely heavy usage, the new construction shows about 30% increase in life over the best type of old cell heretofore used for this service, and the discharge curve is more generally uniform throughout the life of the battery.

The improved results obtainable with my construction I attribute chiefly to the large quantity of electrolyte that the new construction permits, without danger of leakage. As compared with the unlined type of cell, that is one in which the only separator is gelatinized paste, I have obtained with the new construction some very significant changes in the content and distribution of the electrolyte. For example, the percentage by volume of solids in the interelectrode space is reduced from 15% to 25%, thus leaving room for the initial introduction of a greater quantity of active electrolyte into this space. In like manner, the new construction also effects a 25% to 30% increase in the volume ratio of electrolyte to solids in the depolarizing mix, and the total amount of useful and active electrolyte in the new cell commonly runs from 15% to 20% higher than in the old one. With reference to other types of older cells, employing the separators of dense material heretofore used, the comparisons here made would be even more favorable toward my new construction.

In spite of the increase shown in the new cell in both the mix electrolyte, and in the ratio of electrolyte to absorbing solid medium in the interelectrode space, the new construction shows much less tendency to leak under heavy service than prior standard types. It is believed that the leakage tendency of a cell of the old type is chiefly due to a flooding of the paste space by an osmotic water flow in the direction toward the zinc, to dilute a local high concentration of zinc chloride. Ordinarily the cereal paste and dense cellulose of prior structures hinder return flow of the electrolyte to the mix, but the low paste content and loose cellulose fiber structure of my new separator system very effectively lower the osmotic pressure that can be maintained between the mix and the interelectrode space. The highly absorptive quality of the cellulose fibers may also contribute to prevent leakage, but the low osmotic pressure effect, permitting free diffusion of electrolyte through the cellulose, is believed to be the controlling factor.

Thus the separating system proposed by this invention is one characterized by the fact that its structure is such that little or no osmotic pressure effect is set up within the interelectrode space. The proportion by volume of solid to electrolyte in the interelectrode space is considerably lower than that heretofore used, and this solid matter is of highly dispersed form and preferably quite absorptive in character.

While a paper felt packing, as described imparts to the separator system the characteristics desired, and has been found to be especially suitable for the purpose of my invention, it is probable that other materials will produce substantially equivalent results. As one modification it may be suitable to incorporate cellulose fibers in dispersed form directly within the paste itself, and simultaneously reduce the cereal content of the paste. Other changes directly in the paste composition may also be appropriate to obtain a reduction in the osmotic pressure effect as described. These modifications are all within the spirit of my invention, and it should also be apparent that with slight modification the new separator system may be applied to dry cells of other types than the one herein specifically described.

I claim:

1. A dry cell having a zinc cup anode; a cathode of carbon surrounded by a depolarizing mix; and an interelectrode separating system between, and in direct contact with, said depolarizing mix and said anode; said separating system being composed essentially of a loosely assembled mass of cellulose fiber of characteristics substantially similar to "Kimpak" material, and of sufficient dispersion to freely diffuse electrolyte without setting up appreciable osmotic pressure within the interelectrode space.

2. A dry cell having a zinc cup anode; a cathode of carbon surrounded by a depolarizing mix; and an interelectrode separating system between, and in direct contact with, said depolarizing mix and said anode; said separating system being composed of a paper felt packing material of properties substantially identical with "Kimpak", and an electrolyte absorbed therein.

3. A dry cell having a zinc cup anode; a cathode of carbon surrounded by a depolarizing mix; and an interelectrode separating system between, and in direct contact with, said depolarizing mix and said anode; said separating system being composed of a paper felt packing material of properties substantially identical with "Kimpak", and having an electrolyte absorbed therein including a paste containing substantially 10% by weight of cereal.

4. In a dry cell having a zinc cup anode, a cathode and a depolarizer bobbin; an interelectrode separating system between, and in direct contact with, said depolarizing bobbin and said anode, said separating system consisting of a wrapping about said bobbin composed of a loosely assembled mass of cellulose fiber of characteristics substantially similar to "Kimpak" material, impregnated with electrolyte and a paste of low cereal content.

5. In a dry cell having a zinc cup anode, a cathode and a depolarizer bobbin; an interelectrode separating system between, and in direct contact with, said depolarizing bobbin and said anode, said separating system consisting of a wrapping about said bobbin composed of a paper felt packing material of properties substantially identical with "Kimpak", impregnated with electrolyte and a paste of a cereal content substantially 10% by weight.

6. A dry cell having a zinc cup anode; a cathode of carbon surrounded by a depolarizing mix; and an interelectrode separating system between said depolarizing mix and said anode; said separating system being composed essentially of a "Kimpak" paper material.

7. A dry cell having a zinc cup anode; a cathode and a depolarizer bobbin; an interelectrode separating system between said depolarizer bobbin and said anode; said separating system consisting of a wrapping about said bobbin of a "Kimpak" paper material impregnated with electrolyte and a paste, said paste making contact with the zinc anode.

ADGER S. JOHNSON.